Jan. 5, 1960     L. C. STILES ET AL     2,919,487
METHOD OF FORMING CLAD METAL PLATES
Filed Sept. 12, 1955     2 Sheets-Sheet 1
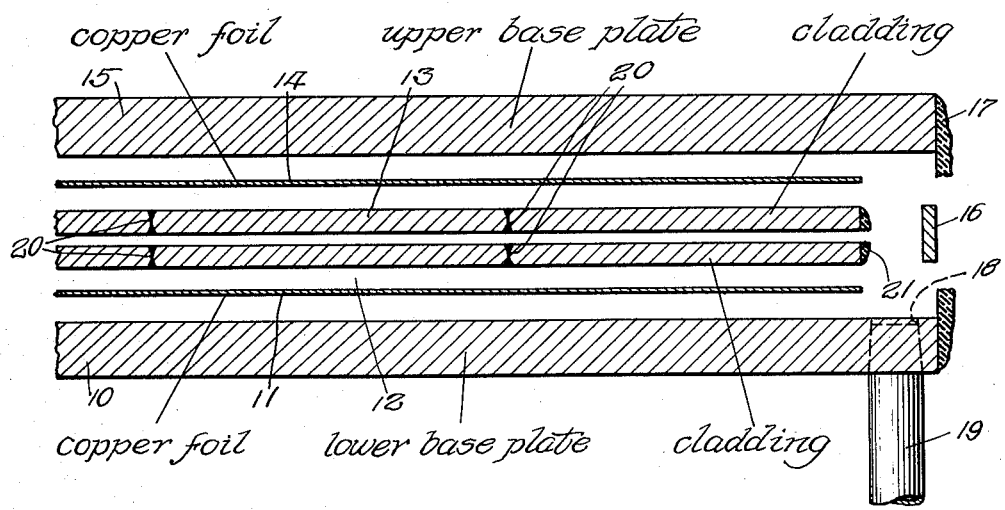
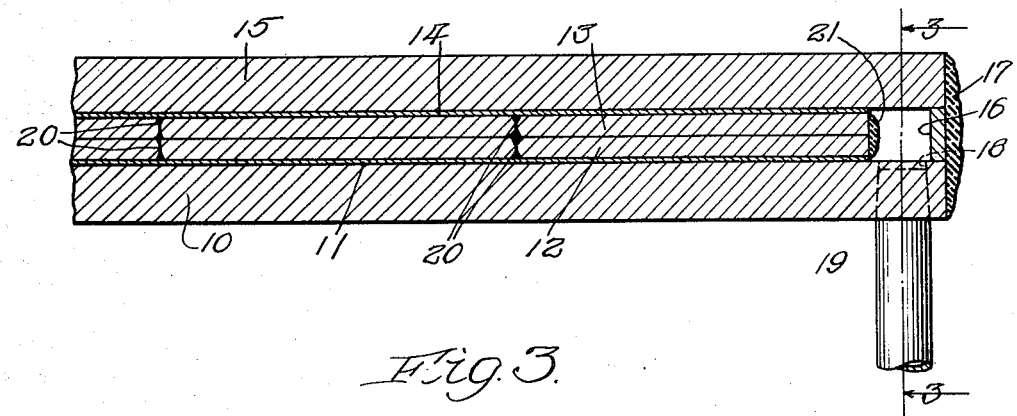
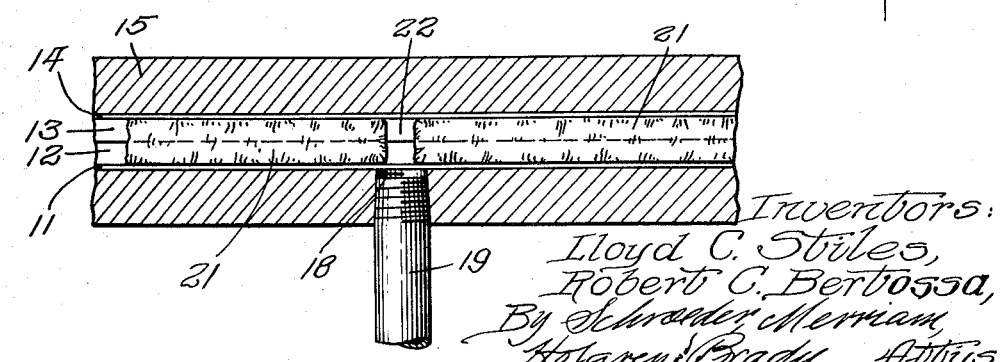
Inventors:
Lloyd C. Stiles,
Robert C. Bertossa,
By Schrader, Merriam,
Hofgren & Brady, Attys.

Jan. 5, 1960 L. C. STILES ET AL 2,919,487
METHOD OF FORMING CLAD METAL PLATES
Filed Sept. 12, 1955 2 Sheets-Sheet 2
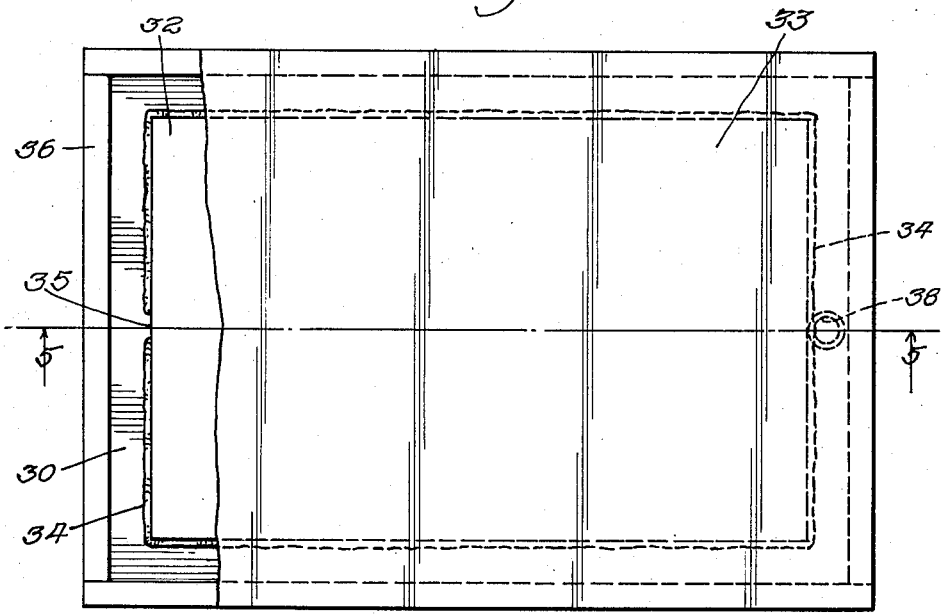
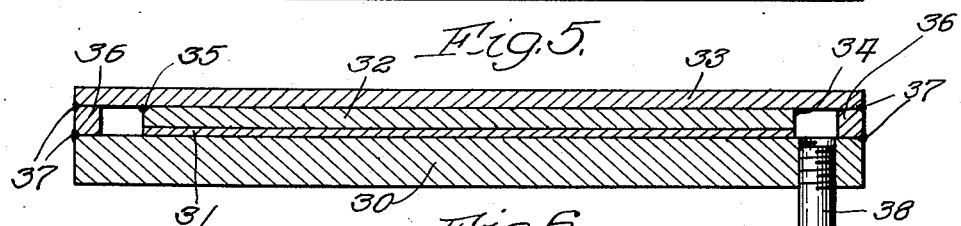
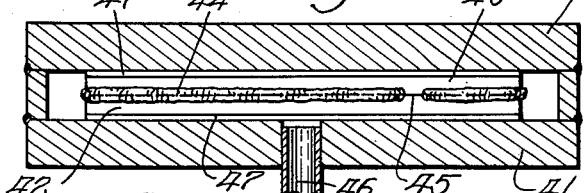
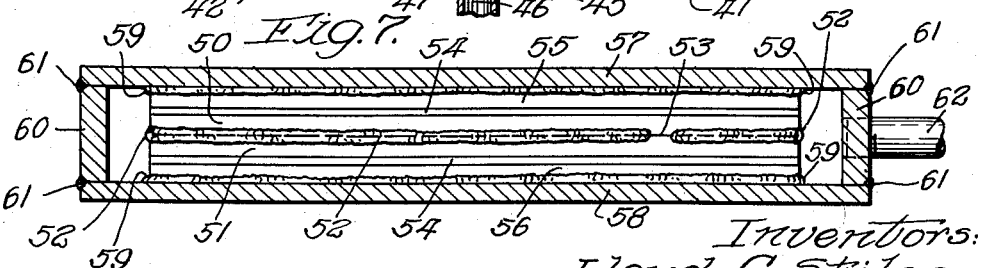
Inventors:
Lloyd C. Stiles,
Robert C. Bertossa,
By Merriam & Lorch,
Attys.

United States Patent Office 2,919,487
Patented Jan. 5, 1960

2,919,487

METHOD OF FORMING CLAD METAL PLATES

Lloyd C. Stiles, Chicago, Ill., and Robert C. Bertossa, Birmingham, Ala., assignors to Chicago Bridge & Iron Company, a corporation of Illinois Application September 12, 1955, Serial No. 533,655

2 Claims. (Cl. 29—471.5)

This invention relates to a cladding assembly and more particularly to a double sandwich cladding assembly and the method of forming the same.

This is a continuation-in-part of our copending application Serial No. 224,808, now abandoned.

In the manufacture of clad plates by the use of brazing material between the base plate and the cladding plate one of the difficulties encountered is the migration of the brazing material. This is particularly so where pressure is maintained during the brazing operation by imposition of a vacuum between the base plate and the cladding plate. Where double sandwiches were employed, or where a single cladding sheet was used between a base plate and a cover plate, the migration of the copper was surprising in its extent. The present sandwich is so sealed as to avoid this difficulty.

The invention will be described in conjunction with the drawings in which Figure 1 is a diagrammatic expanded partial cross-sectional view of a double sandwich; Figure 2 is a cross-sectional view of a portion of the sandwich for brazing; Figure 3 is a cross-sectional view along the line 3—3 of Figure 2; Figure 4 is a plan view of a single cladding sandwich; Figure 5 is a cross-sectional view along 5—5 of Figure 4; Figure 6 is a partial-sectional view of a double cladding sandwich; and Figure 7 is a cross-sectional view of another double cladding sandwich.

The term, "sandwich," is used herein to indicate that the plates or sheets are placed together as in a sandwich with the major dimensions thereof in parallel alignment and with the edges likewise in general parallel arrangement.

As shown in Figures 1 and 2, a conventional sandwich for cladding is formed by assembling a lower base plate 10, a layer of brazing material 11, usually copper foil, of slightly smaller dimensions than the base plate; a layer of cladding material 12 of the same general dimensions as the brazing material, a second layer of cladding material 13 of the same approximate area as the first, the two sheets or plates of cladding material being sealed together around their peripheries to form a substantially hermetic seal 21. Above this is a second layer of brazing material of the same area as the first and an upper base plate 15 of substantially the same area as the lower base plate. It will be appreciated that the brazing material shown in Figure 1 actually is immediately adjacent both the cladding plates and the base plates, and that the two cladding plates themselves are likewise in substantial contact. The drawing is shown in exploded form so that portions thereof may be identified more readily.

The base plates are held apart at their edges in a predetermined spaced relationship by shims 16 and the edges of the base plates are welded as at 17 to form a continuous hermetic seal. However, at least one outlet 18 is provided which is connected by a pipe 19 leading to a vacuum pump capable of maintaining the interior of the structure under substantial subatmospheric pressure during the brazing operation. Normally, the pressure should be below 18 inches of mercury vacuum, and preferably should be close to 28 to 29 inches of mercury vacuum.

The cladding plates may be made up of rectangular sections which are welded together along their adjacent edges as indicated at 20.

After the sandwich has been formed, the cladding plates are brazed to the base plates by appropriate heating action and after cooling, the edges of the sandwich are sheared off to a point immediately within the weld 21 which binds the two clad plates together and there is thus produced two independent clad members.

The usual base plate metals are ordinary steels and the usual clad metals are what may be defined as alloy steels, this term including steels which have been given unusual properties of corrosion resistance, high or low temperature resistance or other like properties. Within this term are included nickel-bearing steels, stainless steels, nickel alloys such as Monel metal, Inconel, etc., and even nickel itself.

With some metals, particularly Monel, there is a tendency for the two cladding plates to adhere after the brazing operation due to inter-diffusion or migration of metal in the solid phase. With such metals it is desirable to employ a separator such as aluminum oxide or the like.

The improvement which we have made in cladding sandwiches is shown first in Figure 3 and comprises providing in the weld 21 about the cladding plates, a very small hole or slit 22 normally only about a quarter of an inch in length. The most convenient way of forming this slit is not to weld about one quarter of an inch of the edge. It would normally have been expected that leaving an opening of this size would defeat the entire purpose of welding the edges inasmuch as the brazing material has almost unbelievable penetrating power. Copper has a great tendency to wet Monel metal, stainless steel, steel, and alloy steels. We have discovered, however, that a small opening, or several small openings, does not allow significant penetration of the brazing material within the inner sandwich.

The provision of this opening or openings prevents any distortion of the cladding plates during heating due to expanding gases. It has been discovered that, particularly with large sheets, gases are generated between the plates which sometimes cause them to separate by a considerable amount. This separation is avoided by the provision of the small opening which permits evacuation of released gases. As has been said before, when this opening is of the proper size the brazing material does not enter except in highly exceptional and unusual cases.

A single cladding sandwich is shown in Figures 4 and 5 equipped with cover plate. In this figure the base plate 30, brazing material 31, cladding plate 32 and cover plate 33 are placed in face-to-face arrangement in that order. The edges of the cladding plate are welded 34 to the cover plate except for at least one opening 35 for allowing released gases to be removed. The weld prevents molten brazing material from penetrating between the cladding plate and cover plate and bonding such surfaces together. The edges of the sandwich are hermetically sealed by shims 36 and welds 37. Vacuum opening 38 is also provided and is connected in operation to a vacuum pump.

The cross-sectional view shown in Figure 6 is of a double cladding sandwich in which base plates 40 and 41 enclose cladding plates 42 and 43. Brazing material 47 is placed between the base plates and cladding plates. The cladding plates are welded together 44 at the edges except for opening 45 which may be a gap in the weld or a drilled hole. Outlet 46 is provided for evacuating the sandwich. It should be noted that the vacuum outlet 46 and hole 45 are not close to each other. This is also shown in Figure 5 since they need not be adjacent to each other although it is preferred that they are so as to assist in maintaining the vacuum by making evacuation of the gases easiest.

The cladding assembly of Figure 7 is related to Figure 6 but employs cover plates to protect the metal of the base plates, or cladding plates if the sandwich is turned inside out. Cladding plates 50 and 51 are sealed 52 about the edges except for opening 53. Brazing material 54 is placed in position and then base plates 55 and 56 are aligned face-to-face to the cladding plates followed by cover plates 57 and 58. The base plates may be welded 59 to the cover plates except for at least one opening, not shown, to allow out-gassing; this welding is optional, however. The assembly is hermetically sealed by shims 60 and welds 61 and is evacuated by opening 62.

Two or more of the cladding sandwiches such as shown in Figure 3 may be placed back-to-back and the edges sealed to form assemblies for cladding more than two base plates simultaneously and such assemblies may or may not use cover plates as desired. Other combinations will be readily apparent after the above description of the invention, which permits removal of gases while preventing penetration of brazing material to surfaces not being bonded, is read.

The foregoing detailed description has been given for clearness of understanding only and no unnecessary limitations should be understood therefrom as modifications will be obvious to those skilled in the art.

What is claimed is:

1. A method of forming a sandwich structure for cladding which comprises assembling a sandwich comprising: a lower base plate, a brazing metal, a cladding plate overlapped by the base plate, a second cladding plate of corresponding area sealed to the first at its periphery to form a package inpenetrable to any substantial quantity of brazing metal, a second layer of brazing material and an overlapping upper base plate, sealing the overlapping peripheral edges of the base plates together, leaving a space between the seal of the cladding plates and the seal of the base plates, the sealing of the first cladding plate to the second cladding plate being interrupted in a small area, creating a vacuum in the space between the base plate seal and the cladding plate seal for evacuating the interior of the sandwich leaving the cladding plates free of any seal to the base plates, and heating the sandwich to effect brazing.

2. A method of forming clad plates comprising forming a sandwich including a cladding plate and a base plate in substantially continuous face-to-face arrangement with a supply of brazing material between said plates in the area to be clad and a cover plate over the cladding plate in face-to-face arrangement therewith, sealing the edges of the cladding plate to the cover plate except for a small opening, hermetically sealing the edge of the base plate to the edge of the cover plate to produce a chambered area but providing an opening for evacuating the chambered area, creating a vacuum in the chambered area, leaving the cladding plate free from any seal to the base plate, and heating the sandwich to effect brazing.

References Cited in the file of this patent

UNITED STATES PATENTS

| | | |
|---|---|---|
| 1,931,311 | Young | Oct. 17, 1933 |
| 2,147,407 | Huston | Feb. 14, 1939 |
| 2,713,196 | Brown | July 19, 1955 |